April 17, 1956  G. B. BRITTON  2,741,797
MACHINE AND METHOD FOR EJECTING MOLDED
RUBBER HEELS AND THE LIKE
Filed July 17, 1950  5 Sheets-Sheet 1
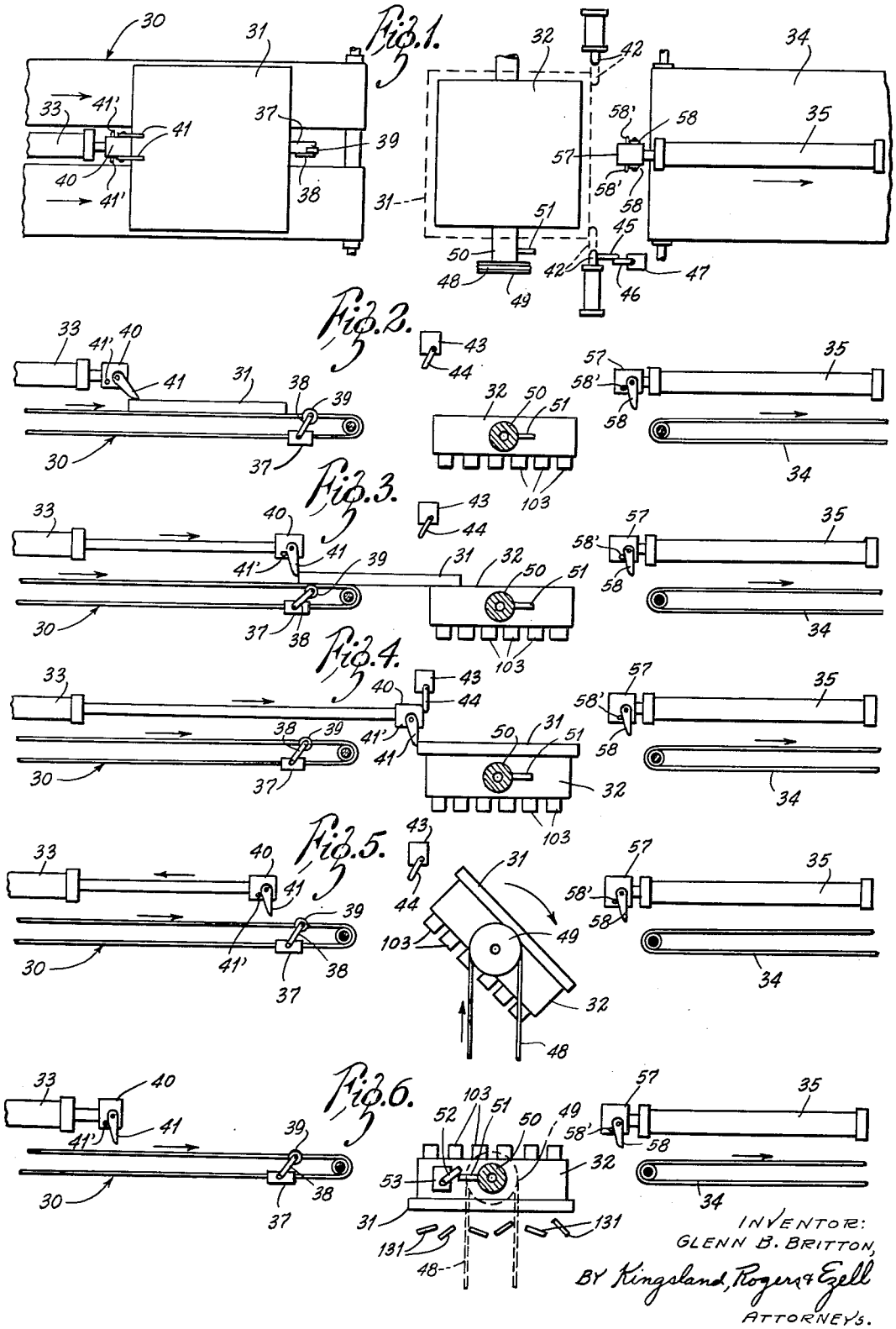
INVENTOR:
GLENN B. BRITTON,
BY Kingsland, Rogers & Ezell
ATTORNEYS.

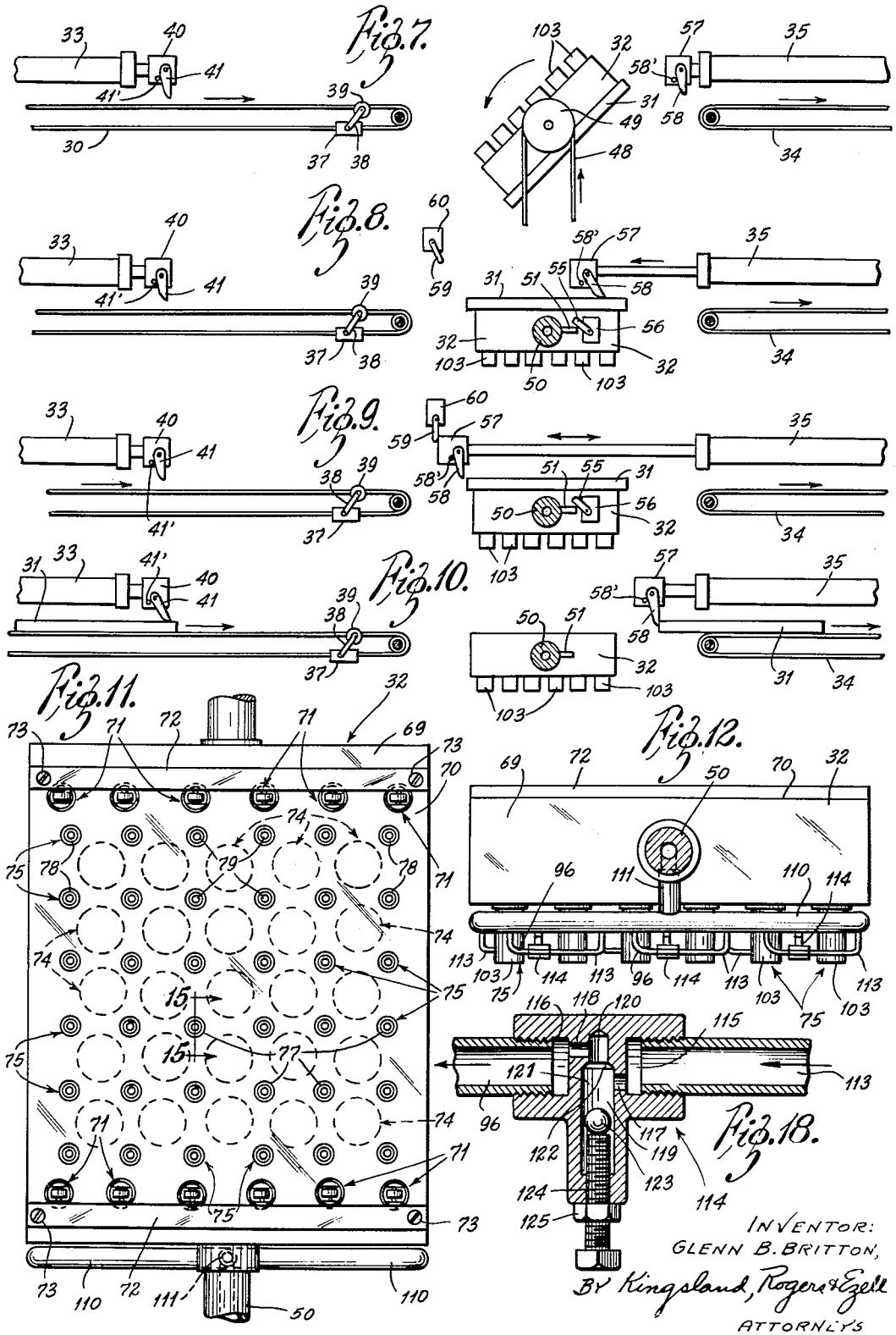

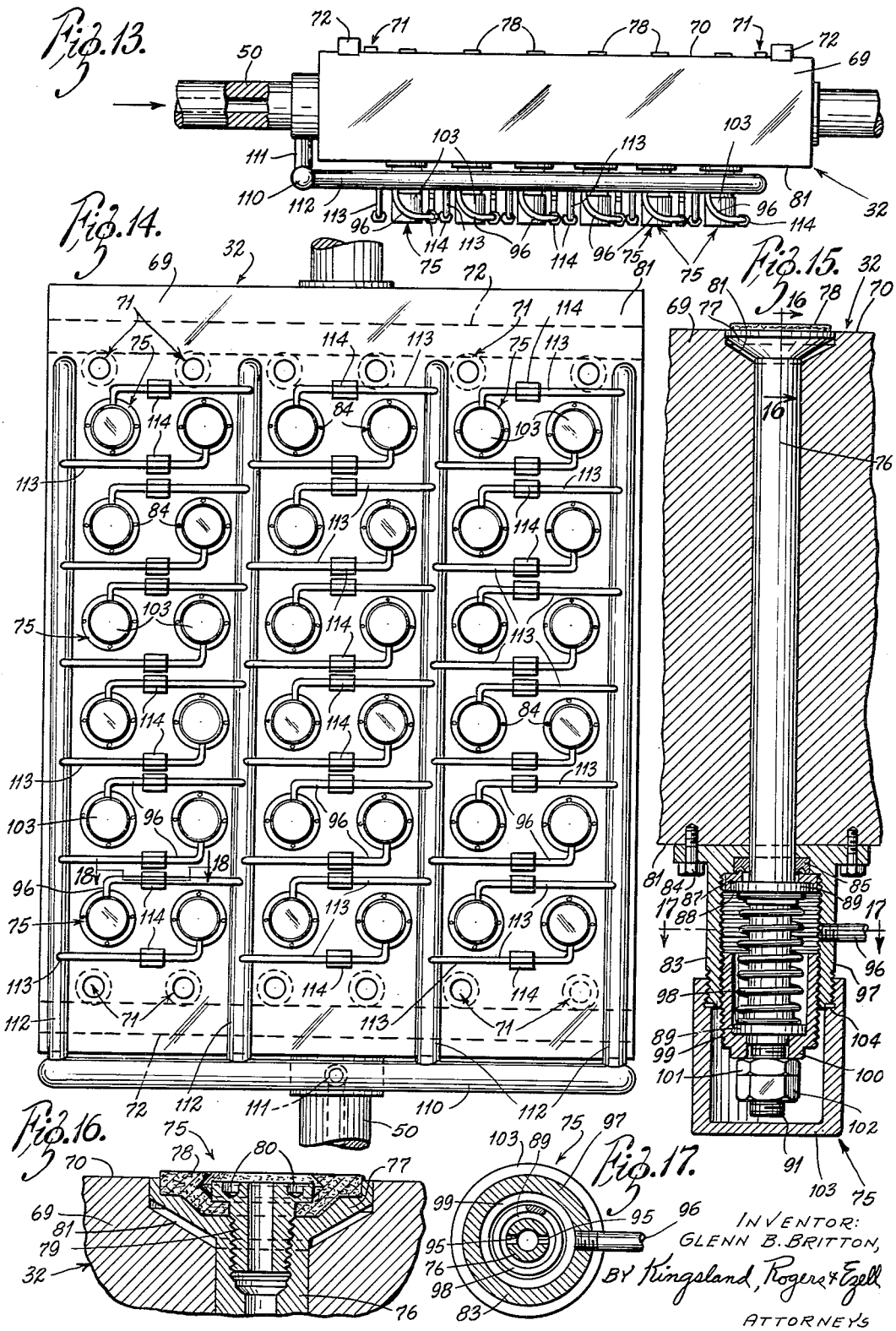

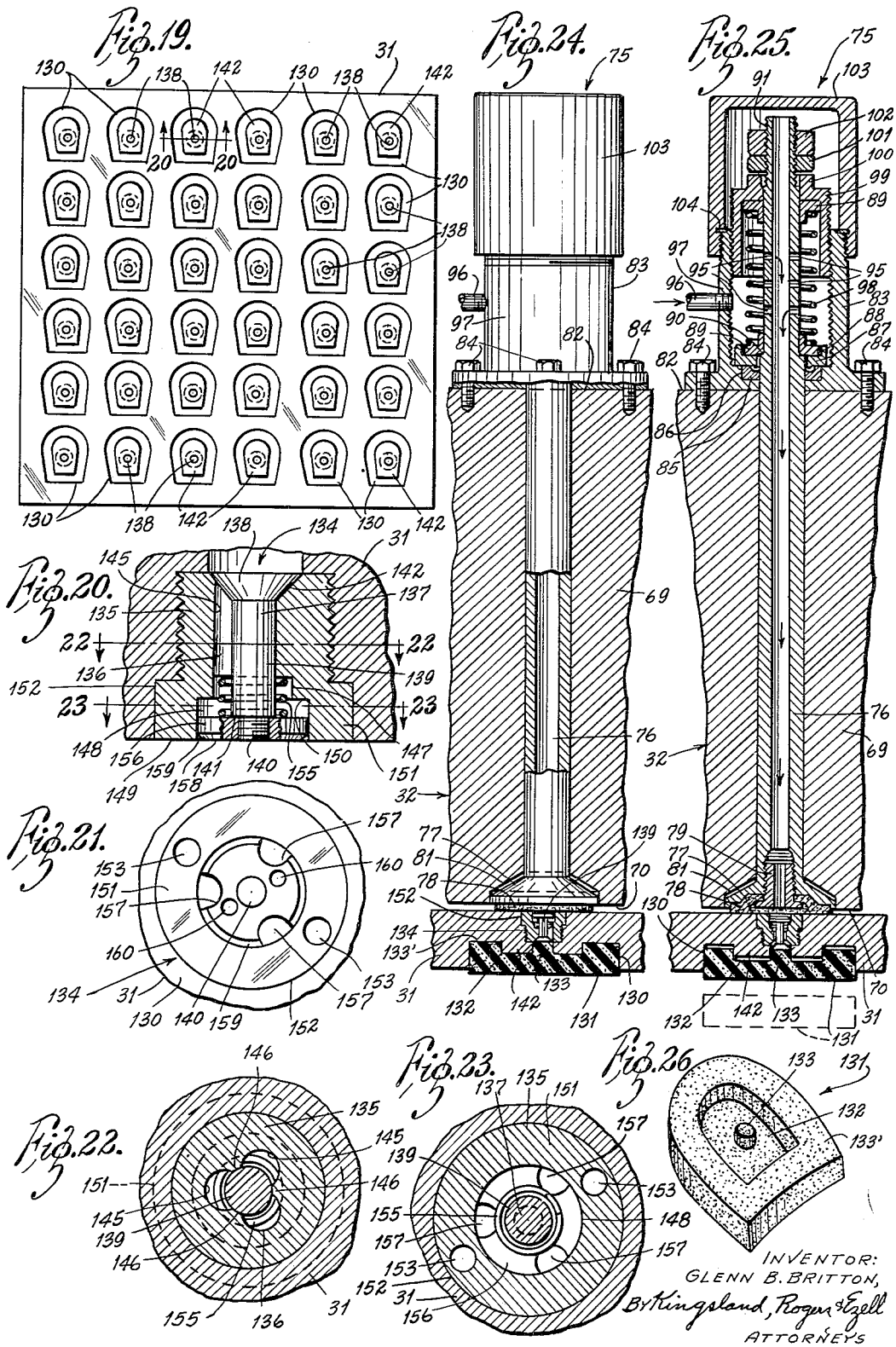

April 17, 1956 G. B. BRITTON 2,741,797
MACHINE AND METHOD FOR EJECTING MOLDED
RUBBER HEELS AND THE LIKE
Filed July 17, 1950 5 Sheets-Sheet 5

Fig.27.

INVENTOR:
GLENN B. BRITTON,
BY Kingsland, Rogers & Ezell
ATTORNEYS.

United States Patent Office 2,741,797
Patented Apr. 17, 1956

2,741,797

MACHINE AND METHOD FOR EJECTING MOLDED RUBBER HEELS AND THE LIKE

Glenn B. Britton, Hannibal, Mo., assignor to International Shoe Company, St. Louis, Mo., a corporation of Missouri Application July 17, 1950, Serial No. 174,233

16 Claims. (Cl. 18—2)

The present invention relates to a machine and method of ejecting molded articles, such as rubber heels and the like, from a mold plate.

The purpose of the present invention is to provide for ejecting from a mold plate molded rubber shoe heels or the like in substantial numbers by an automatic process that largely eliminates manual labor. Specifically, it is an object of the invention to handle certain mold plates having a plurality of mold cavities therein automatically through an ejecting stage.

Briefly, the invention comprises both a method and automatic means for removing a mold plate from a feed conveyer onto an invertible table, holding the mold plate to the table while the latter is inverted, applying compressed air to effect ejection of the contents of the mold plate, reverting the table while still holding the mold plate, and removing the mold plate onto a take-off conveyer.

Inasmuch as it is an important object of the present invention to provide for rapid automatic action of the ejecting cycle, an electrical control circuit actuated by various moving elements of the apparatus is provided to cause proper sequential action of the various hydraulic, air, and electrical units.

The following description of principles, construction, and operation will clearly disclose the unique and novel features of the apparatus of the present invention, and will make apparent the many advantages of the novel method presented.

In the drawings:

Figure 1 is a diagrammatical plan view of the apparatus used in ejecting molded heels from a mold plate;

Figure 2 is a similar side elevation of the apparatus of Figure 1, the mold plate being in a position just prior to displacement onto a rotatable ejector table;

Figure 3 is a side elevation similar to Figure 2, but showing the mold plate in an intermediate stage between the feeding-in conveyer and the ejector table;

Figure 4 is a view similar to Figure 3, but showing the mold plate positioned on the ejector table with a limit switch operated to stop the on-feeding of the mold plate;

Figure 5 is a view similar to Figure 4, but showing the on-feeding arm retracting and the ejector table at an intermediate stage of rotation;

Figure 6 is a view similar to Figure 5, but showing the ejector table in inverted position, with the heels ejected therefrom;

Figure 7 is a view similar to Figure 6, but showing the ejector table reverting;

Figure 8 is a view similar to Figure 7, showing the ejector table reverted and showing take-off means advancing to engage the mold plate to effect its removal from the ejector table;

Figure 9 is a view similar to Figure 8, but showing the take-off arm advanced to full position where it may engage the mold plate;

Figure 10 is a view similar to Figure 9, showing the mold plate taken completely from the ejector table onto a take-off conveyer, and showing a new mold plate advancing toward the ejector table;

Figure 11 is a plan view of the ejector table, viewed from the top as it appears in Figures 2 through 4 and from the bottom in Figure 6;

Figure 12 is an end elevation of the ejector table taken for example from the bottom of Figure 11;

Figure 13 is a side elevation of the ejector table viewed from the right hand side of Figure 12;

Figure 14 is a plan view of the ejector table taken from the face opposite that shown in Figure 11;

Figure 15 is a fragmentary section through the ejector table, showing an individual pressure stem arrangement therein, taken approximately on the line 15—15 of Figure 11;

Figure 16 is a fragmentary section through the valve head, taken approximately on the line 16—16 of Figure 15;

Figure 17 is a transverse section through part of the pressure stem mechanism, and approximately on the line 17—17 of Figure 15;

Figure 18 is a section through one of the air flow cut-off valves, taken approximately on the line 18—18 in the lower left-hand part of Figure 14;

Figure 19 is a plan view of a typical mold plate;

Figure 20 is a fragmentary section on the line 20—20 at the upper middle part of Figure 19, showing a typical pop-out valve of the mold plate;

Figure 21 is a bottom view of the pop-out valve of Figure 20;

Figure 22 is a transverse section through the pop-out valve, taken on the line 22—22 of Figure 20;

Figure 23 is another transverse section through the pop-out valve, taken on the line 23—23 of Figure 20;

Figure 24 is a fragmentary view, partly in section, showing the ejector mechanism for one heel cavity of the mold, together with the associated pressure stem for operating the same on the ejector table;

Figure 25 is a view similar to Figure 24, but with additional sections and with the air operated parts being shown in an operative position just prior to ejection of the heel from the mold cavity;

Figure 26 is a view of a typical rubber heel; and

Figure 27 is a schematic diagram of a typical circuit for automatic control of the sequential action of the ejecting apparatus.

By referring to Figures 1 through 10, an idea can be obtained of the general apparatus involved in the present invention. There are shown a split conveyer 30 that is capable of advancing mold plates 31 to the right in the view, these plates being advanced toward a rotatable ejector table 32. Supplemental pusher displacement means, comprising a conventional double-acting hydraulically operated piston generally indicated at 33, is associated with the conveyer 30 to discharge the mold plate 31 from the end of the conveyer onto the ejector table 32 in proper timed relationship to other phases of the overall operation, as will appear.

Beyond the ejector table 32 is a take-off conveyer 34 and, associated therewith, a conventional double-acting piston type of puller 35 for moving the mold plate from the turn-over 32 to the conveyer 34.

Near the end of the conveyer 30 is mounted a switch 37 having a pivoted arm 38 preferably surmounted by a roller 39. As indicated in Figures 1 and 2, an advancing mold plate such as 31 will strike the roller 39 and move the arm upon which it is mounted and thereby actuate the switch 37.

The switch 37, thus actuated, will cause a hydraulically operated pusher head 40 having pivoted lugs 41 and lug stops 41' to advance and push the mold plate 31 from the conveyor onto the ejector table 32, as indicated in Figure 3. Actuation of the switch 37 also causes two double-acting hydraulically operated stop pins 42 to advance to the dotted positions shown in Figure 1, where they act as stops to insure proper positioning of the mold plate 31 on the ejector table 32.

When the pusher head 40 has advanced to the position of Figure 4, the mold plate is sufficiently close to the stop pins to permit its inertia to carry it the remaining short distance, and a suitably mounted switch 43 is actuated by the pusher head 40 moving against an actuating arm 44. This actuation of the switch 43 causes the pusher head 40 and the stop pins 42 to retract to their original positions and at the same time causes the electromagnetic windings of the ejector table 32 to be energized, and thus to attract and hold the mold plate 31 firmly to the ejector table.

When the stop pins 42 are retracted, a projecting pin 45 secured as by threaded engagement to one of the stop pins 42 strikes an actuating arm 46 to actuate a switch 47, as shown in Figure 1. Thus actuated, the switch 47 causes a pair of coacting hydraulic pistons (not shown) to move a chain 48 engaging a sprocket 49 appropriately secured to a trunnion 50 so as to rotate the ejector table 32 180° from the position of Figure 4, through the position of Figure 5, thus inverting the mold plate 31.

In the position of Figure 6, a projecting pin 51, secured as by threaded engagement to the trunnion 50 of the table 32, acts against an actuating arm 52 to actuate a switch 53, thus causing air under pressure to be delivered to the ejector table 32 for the purpose of ejecting the contents of the mold plate 31, as shown in Figure 6. Actuation of the switch 53 also causes a time switch (not shown) to be energized. Upon the elapse of a predetermined interval of time after initial energization, this time switch causes the ejecting air to be cut off and causes also the return of the ejector table 32 from the position of Figure 6, through the position of Figure 7, to its original position as shown in Figure 8. In the latter position, the projecting pin 50 acts against an actuating arm 55 to actuate a switch 56, thus causing a puller head 57 having pivoted lugs 58 and lug stops 58' to advance to the position of Figure 9. In this position, the puller head 57 acts against an actuating arm 59 to actuate a switch 60 which causes the electromagnet to be deenergized, and at the same time causes the puller head 57 to be retracted, thus pulling the mold plate 31 off the ejector table 32 onto the conveyor 34, as shown in Figure 10.

The ejector table 32 has a bed 69 which has mounted therein so as normally to project a predetermined distance beyond an upper face 70 thereof a plurality of spring loaded roller assemblies 71. The construction of the roller assemblies 71, as well as the manner in which they may be mounted in a bed such as 69 in the present invention, is the subject of co-pending application, Serial No. 174,234, filed July 17, 1950, said application having since matured into Patent No. 2,617,509, issued November 11, 1952. The roller assemblies 71 are arranged in two rows normal to the axis of rotation of the table 32, as shown in Figure 11, and are retained by strips 72 secured by screws 73, the rows of rollers being so spaced one from the other as to support the mold plates 31 between the strips 72.

The ejector table 32 includes also, interspersed in spaced relation as shown in Figure 11, a plurality of magnet coils 74 and pressure stem assemblies 75. Each pressure stem assembly 75 includes a hollow stem 76 having a conical shaped head 77 into which is inserted a molded flexible gasket 78 retained by a flanged retaining sleeve 79 threaded into the stem 76 by means of indentations 80, as shown in Figure 16. The stem 76 is slidably mounted in the bed 69 so that the head 77 slidably fits into a similarly shaped recess 81 at the upper face 70 of the bed 69. The other end of the stem 76 projects beyond a lower face 82 of the bed 69, and extends axially and slidably through a flanged cylindrical body 83 secured to the lower face 82 by screws 84. A molded flexible packing ring 85 is inserted in a recess 86 of the body 83 and is retained therein by a spring loaded collar 87 having a recess 88 which receives one of two spring washers 89. The spring washer 89 disposed in the recess 88 also abuts a shoulder 90 formed by a reduction in diameter of the stem 76, which reduced diameter extends to an externally threaded end 91. The wall of this reduced portion of the stem 76 is pierced transversely at a plurality of points, as shown in Figure 25, to form passages 95 for admission of air pressure to the hollow stem 76, said air pressure being introduced to the interior of the body 82 by means of an individual air supply tube 96 threaded into a wall 97 of the body 82.

A compression spring 98, acting between the spring washers 89, is retained by a spring retainer 99 in adjustable threaded engagement with the body 83. The spring retainer 99 has an annulus 100 to provide abutment for an adjustable stop nut 101 secured by a jamb nut 102. A removable cup-shaped cap 103 threaded to the body 83 encloses the elements of the pressure stem assembly extending beyond the internally threaded end of the body 83, and acts to compress a gasket 104 to make an airtight joint at this threaded connection.

A plurality of the pressure stem assemblies 75 disposed in the bed 69 of the ejector table 32, as shown for example in Figure 14, are controllably supplied with air under pressure by means of a piping arrangement such as that shown in Figure 14, wherein a header 110 receives air by way of the hollow trunnion 50 and a transfer tube 111, and delivers it to a plurality of distributing tubes 112. Individual take-off tubes 113 convey the air from an appropriate tube 112 to individual air flow cut-off valves 114 from which the tubes 96 extend to the individual pressure stem assemblies 75, there being a cut-off valve 114 for each stem assembly 75. Each cut-off valve 114 has a threaded inlet chamber 115 and a threaded outlet chamber 116, these chambers being respectively connected by offset passages 117 and 118 to a large diameter portion 119 and to a small diameter portion 120 of a common well 121, the portions 119 and 120 being coaxial and forming a ball seat 122 at their junction, as shown in Figure 18. A ball 123, freely movable in the large diameter portion 119 of the well 121, but capable of occupying the ball seat 122 so as to prevent the flow of air from the portion 119 to the portion 120 is adjustably restrained from moving beyond a predetermined distance away from the seat 122 by a screw 124 secured by a jamb nut 125. The valve 114 is so mounted with respect to the ejector table 32 that, when the latter is inverted as aforementioned, the ball 123 will fall by gravity away from the seat 122.

A typical mold plate 31, as shown in Figure 19, has a plurality of mold cavities 130 for molding rubber heels such as 131 in Figure 26 or the like. It will be noted that the heel 131 has an open recess 132 formed by means of appropriately shaped cores 142 mounted within the cavities 130. The cores 142 also cause to be formed in the heel 131 an upstanding teat 133 extending to the level of an upper face 133' of the heel. In the floor of each cavity 130 is a pop-out valve assembly 134 comprising a plug 135 having a fluted bore 136 in which is slidably disposed a valve 137. The valve 137 has a conical shaped head 138 and a cylindrical stem 139, the latter being reduced in diameter at a threaded end 140 to leave a shoulder 141.

The fluted bore 136 of the plug 135 may comprise a plurality of spaced flutes 145 and lands 146, as shown in Figure 22, and communicates axially at its upper end (as in Figure 20) with a conical shaped recess 142 adapted to receive the head 138 of the valve 137 in a manner to close off this end of the bore 136 when the head 138 is seated. At its lower end, the fluted bore 136 communicates axially with a cylindrical bore 147 having a diameter sufficient to circumscribe the fluted bore 136. The cylindrical bore 147 opens into an axially disposed bore 148 of larger diameter which extends to a face 149 of the plug 135, leaving a shoulder 150. The plug 135 has a cylindrical head 151, which rotatably fits into a cylindrical recess 152 of the mold plate 31 when the plug is inserted therein, as by threaded engagement. Indentations 153 in the face 149 of the plug 135 aid in inserting the plug so as to bring the ends thereof flush with the adjacent faces of the mold plate 31, as shown in Figure 20.

The valve 137 is continuously urged in a direction tending to seat its head 138 in the recess 147 by a compression spring 155 acting between the upper end of the cylindrical bore 147 and a nut 156 in threaded engagement with the threaded end 140 of the valve stem 139. The nut 156 is round in section so as to slidably fit the bore 148, and has a plurality of notches 157 spaced around its periphery to permit passage of air under pressure. The thickness of the nut 156 is such that a face 158 thereof having a chamfered edge 159 is substantially flush with the face 149 of the plug 135 when the nut abuts the shoulder 141 and when the head 138 is seated. Indentations 160 in the face 158 aid in attaching the nut 156 to the valve stem 139. Upward or unseating movement of the valve 137 is limited by abutment of the nut 156 against the shoulder 150.

Figure 27 shows a typical schematic circuit diagram suitable for automatic control of the sequential action of the ejecting apparatus. As indicated in this diagram, all hydraulic units are controlled by solenoid operated hydraulic valves. Although the hydraulic valves are preferably double-acting for forward and reverse movement of the hydraulic units, solenoid operation of the valves is required in one direction only where spring means are employed to effect return of the valves to their original positions. The air valve, also solenoid operated, is single acting, spring means being employed to maintain this valve in a closed position except during energization of the air valve solenoid.

Thus at the beginning of operations, all hydraulic valves are in their spring effected positions, causing the various active elements of the ejector apparatus to assume the positions shown in Figures 1 and 2, the magnetic windings 74 of the ejector table 32 are deenergized, and the air valve is closed by its spring. When the single pole, single throw, normally open switch 37 is actuated as aforementioned, an electric current from a source such as 171 flows through the now closed contacts 172 of this switch, thence along a first path through a coil 173 of a single pole, single throw, normally open relay 174 to ground, and along a second path through normally closed contacts 175 of the double pole, single throw switch 43, and thereafter separately through solenoids 176 and 177 of the valves controlling operation of the pusher head 40 and the stop pins 42 respectively to ground. As soon as the relay coil 173 is energized, normally open contacts 178 of the relay 174 close so as also to conduct current from the source 171 separately through the solenoids 176 and 177 to ground, and separately also through the normally closed contacts 175 of the switch 43 through the relay coil 173 to ground. Thus, despite subsequent reopening of the normally open contacts 172 of the switch 37, which occurs when the mold plate 31 is pushed beyond this switch, the solenoids 176 and 177 (as well as the relay coil 173) remain energized and cause the stop pins 42 to remain in advanced position and the pusher head 40 to continue to advance until the latter actuates the swich 43, whereupon the normally closed contacts 175 of the switch 43 open to deenergize the relay coil 173 which in turn permits the normally open contacts 178 of the relay 174 to open and thus to deenergize also the solenoids 176 and 177. Deenergization of the latter two solenoids permits the aforementioned spring means to effect movement of the hydraulic valves associated with these two solenoids so as to cause the return of the pusher head 40 and the stop pins 42 to their original positions. Despite the obviously momentary actuation of the switch 43, the relay coil 173 and the solenoids 176 and 177 will not be reenergized until the switch 37 is again actuated by the approach of another mold plate.

In addition to the above described effects of the actuation of the switch 43, the momentary closure of normally open contacts 180 thereof permits current from the source 171 to flow through these now closed contacts 180, thence along a first path through a coil 181 of a single pole, single throw, normally open relay 182 to ground, and along a second path separately through the magnet coils 74 to ground, and through normally closed contacts 183 of a triple pole, single throw relay 184, through normally closed contacts 185 of a time switch 186, through a coil 187 of a double pole, single throw relay 188 to ground. As soon as the relay coil 181 is energized, normally open contacts 189 of the relay 182 close so as also to permit current to flow from the source 171 through normally closed contacts 190 of the single pole, single throw, normally closed switch 60, through the now closed contacts 189 of the relay 182 separately through the relay coil 181 to ground, through the magnet coils 74 to ground, and through the normally closed contacts 183 of the relay 184, through the normally closed contacts 185 of the time switch 186, through the relay coil 187 to ground. Thus, despite the momentary nature of the actuation of the switch 43 and the consequent immediate reopening of the normally open contacts 180 thereof, the magnet coils 74 (as well as the relay coils 181 and 187) remain energized and cause the mold plate to be continuously attracted to the ejector table 32.

Energization of the relay coil 187, as above mentioned, causes normally open contacts 195 and 196 of the relay 188 to close. The closure of the former has no immediate effect inasmuch as the single pole, single throw, normally open switch 53 has not yet been actuated. Actuation of the single pole, single throw normally open switch 47, however, will occur almost simultaneously with the energization of the relay coil 187 and a current will flow from the source 171 through the now closed contacts 197 of the switch 47, through the now closed contacts 196 of the relay 188, through a solenoid 198 of the valve controlling operation of the ejector table rotating mechanism to ground. The consequent rotation of the ejector table 32, resulting subsequently in actuation of the switch 53, causes normally open contacts 200 of the switch 53 to close and permits a current from the source 171 to flow separately through the now closed contacts 195 of the relay 188, through a solenoid 201 of the air valve to ground, and through a timing element 202 of the time switch 186 to ground. The flow of current through the timing element 202 of the time switch 186 for a predetermined period of time, for example five seconds, causes the time switch to be actuated, thus opening the normally closed contacts 185 thereof and deenergizing the relay coil 187, which in turn permits the normally open contacts 195 and 196 of the relay 188 to open, and thus to deenergize also the solenoids 201 and 198. Deenergization of the latter two solenoids permits the aforementioned spring means to effect movement of the valves associated with these two solenoids so as to shut off the ejecting air and cause the ejector table 32 to rotate back to its original position.

The above mentioned actuation of the time switch 186, in addition to the effects above described, causes normally open contacts 205 thereof to close, which circumstance, coupled with the fact that a spring loaded pole 206 of the single pole, double throw switch 56 has already closed on a contact 207 of the switch 56 (having done so when the ejector table 32 left its original position) permits a current to flow from the source 171 through the normally closed contacts 190 of the switch 60, through the now closed contacts 189 of the relay 182, through the pole 206 and the contact 207 of the switch 56, through the now closed contacts 205 of the time switch 186, through a coil 208 of the relay 184 to ground. As soon as the relay coil 208 is energized, normally open contacts 209 of the relay 184 close so as also to permit current to flow from the source 171 through the normally closed contacts 190 of the switch 60, through the now closed contacts 189 of the relay 182, through the now closed contacts 209 of the relay 184, through the relay coil 208 to ground. Thus, although actuation of the time switch 186 may be only momentary, the relay coil 208 will remain energized. Also, inasmuch as the energization of the relay coil 208 causes the normally closed contacts 183 of the relay 184 to open, immediate reclosure of the normally closed contacts 185 of the time switch 186 will not cause reenergization of the relay coil 187 of the relay 188. On the other hand, although the return rotation of the ejector table 32 permits the return of the contacts 200 of the switch 53 to their normally open position, thus deenergizing the timing element 202 of the time switch 186, it is not necessary for the time switch 186 to return immediately to its "normal" position, which return may, as a matter of fact, occur at any time after actuation of this switch up to the time the switch 43 is actuated on the following cycle of the ejecting apparatus. Even a further delay, however, will only result in a delay in the following cycle between the time a mold plate 31 is magnetically attracted to the ejector table 32 and automatic resumption of the normal action of the ejecting cycle when the time switch 186 finally does revert to "normal" position.

Although the energization of the relay coil 208 causes normally open contacts 212 of the relay 184 to close, this has no effect until the return of the ejector table 32 to its original position causes the pole 206 of the switch 56 to move from the contact 207 to a contact 213 of this switch, whereupon a current is permitted to flow from the source 171 through the normally closed contacts 190 of the switch 60, through the now closed contacts 189 of the relay 181, through the pole 206 and the contact 213 of the switch 56, through the now closed contacts 212 of the relay 184, through a solenoid 214 controlling the operation of the puller head 57 to ground.

The energization of the solenoid 214 causes the puller head 57 to advance until it actuates the switch 60, whereupon the consequent momentary opening of the normally closed contacts 190 thereof deenergizes not only the magnet coils 74 and the solenoid 214, but also both the relay coil 181 and the relay coil 208, which respectively permit the reopening of the normally open contacts 189 of the relay 182 and of the normally open contacts 212 and 209 of the relay 184, which thus precludes reenergization of the magnet coils 74 and the solenoid 214 (as well as the relay coils 181 and 208) despite the immediate reclosure of the normally closed contacts 190 of the switch 60.

Deenergization of the magnet coils 74 releases the magnetic attraction of the ejector table 32 upon the mold plate 31 and deenergization of the solenoid 214 permits the aforementioned spring means to effect movement of the hydraulic valve associated with this solenoid so as to cause the return of the puller head 57 to its original position, thus to remove the mold plate 31 from the ejector table 32.

Upon return of the puller head 57 to its original position, all of the ejecting apparatus as well as all electrical control circuits are as at the beginning of operations, the above described cycle being repeated whenever a mold plate such as 31 approaches and actuates the switch 37.

As aforementioned, the actual ejection of the contents of the mold plate 31 is effected by air under pressure. As the mold plate 31 is pushed onto the ejector table, therefore, it is guided laterally by the strips 72 as it moves along the tops of the rollers 71 adjacent thereto, until the leading edge of the plate abuts the stop pins 42. While supported by the rollers 71, the bottom of the mold plate 31 is enabled to pass over the flexible gaskets 78 of the pressure stem assemblies 75, although these gaskets 78 partially project above the face 70 of the ejector table 32, as shown in Figure 13. When the mold plate 31 comes to rest against the stop pins 42, its position with respect to the ejector table 32 is such as to dispose each of the several pop-out valve assemblies 134 in substantial axial alignment with and immediately above one of the pressure stem assemblies 75. The energization of the magnet coils 74, then, attracts the mold plate 31 towards the face 70 of the ejector table 32 causing the rollers 71 to be depressed into their sockets (as described in co-pending application, Serial No. 174,234, filed July 17, 1950), now Patent No. 2,617,509 granted November 11, 1952, and causing the mold plate 31 to rest with pressure against the several gaskets 78 as shown (inverted) in Figures 24 and 25. This application of pressure upon the gaskets 78 of the pressure stem assemblies 75 causes a slight depression of each pressure stem 76 against the action of its spring 98 so as to care for irregularities of manufacture or assembly, thus effecting an airtight connection between each pop-out valve assembly 134 and its corresponding pressure stem assembly 75.

After the ejector table has rotated to its inverted position as aforementioned, the actuation of the air valve (not shown) causes air under pressure to flow through the hollow trunnion 50, through the transfer tube 111, through the several distributing tubes 112, through the several individual take-off tubes 113, through the several individual air flow cut-off valves 114 (the balls 123 having dropped by gravity away from the seats 122), through the individual supply tubes 96, and through the pressure stem assemblies 75 to the pop-out valve assemblies 134. As the air under pressure reaches each pop-out valve assembly 134, it passes through the notches 157 and through the flutes 136 to bear against the conical head 138 of the valve 137, and thus to urge the valve head 138 against the teat 133 of the heel 131, as shown in Figure 25. This movement of the valve head 138 tends to dislodge the heel 131 from its mold cavity 130 and at the same time permits air under pressure to flow past the now unseated head 138 into the recess 132 of the heel 131. Each heel 131 is thus ejected from the mold plate 31 and falls away therefrom by gravity.

As each heel 131 leaves its cavity 130 in the mold plate 31, the velocity of air flow through the corresponding individual air flow cut-off valve increases sufficiently to entrain the ball 123 thereof and causes it to occupy its seat 122, thus cutting off the flow of air through each cavity 130 from which a heel has been ejected and thereby maintaining normal pressure throughout the remainder of the system.

The foregoing description has disclosed a novel method and a preferred embodiment of a machine for ejecting molded rubber heels and the like. The disclosures included therein are in no sense restrictive, and the substitutions of equivalent principles and physical elements is viewed as coming within the scope of the present invention.

What is claimed is:

1. A device for ejecting molded articles from a mold, said device including, in combination, an invertible table, means to displace a mold onto the table, means to retain the mold in contact with the table whereby the entire mold including the contents thereof may be inverted, when the table is inverted, means to invert the table, means including movable elements mounted in the table to effect ejection of molded articles from the mold, means to restore the table to its original position, and means to displace the mold from the table.

2. A device for ejecting molded articles from a mold, said device including, in combination, an invertible table having means operable to retain a mold in contact therewith when the table is inverted and having also a passage to conduct a fluid therethrough, said passage having an opening to communicate with the mold whereby the fluid may be effective to expel molded articles from the mold, means operable to invert the table, a first displacement means operable to effect placement of a mold on the table, a second displacement means operable to effect removal of a mold from the table, and control means including switch means operable to effect in predetermined automatic sequence the placement on and removal from the table of a mold, the inversion of the table, the flow of fluid through the table, and the restoration of the table to its original position.

3. A device for ejecting molded articles from a mold, said device including, in combination, an invertible table having electromagnetic means to retain a mold in contact therewith, a mold having a plurality of mold cavities containing molded articles, each mold cavity having associated therewith individual means to receive fluid pressure whereby the molded articles may be expelled from the mold cavities, a plurality of openings in the table, said openings being adapted to communicate respectively with the aforesaid means to receive fluid pressure, individual passages communicating respectively with said openings thereby to conduct fluid to the aforesaid means to receive fluid pressure, individual valve means associated respectively with each of said individual passages, said valve means being responsive to the velocity of fluid flow therethrough, thereby to effect control of fluid flow through the said passages, a fluid supply including means to control the total flow thereof to the said individual passages, power operated means to invert the aforesaid table, said power operated means being reversible to restore the table to its original position, a first power operated displacement means to effect placement of the aforesaid mold upon the table, means to insure proper placement of the mold upon the table, a second power operated displacement means to effect removal of the mold plate from the table, and control means including electrical switch means and including also valve means, said control means being effective automatically to cause the various elements and means aforesaid to operate in predetermined cyclic sequence so as to receive individual molds as they are advanced to the vicinity of the device, to eject the molded contents thereof, and to place the emptied molds for removal from the vicinity of the device.

4. In a device for ejecting molded articles from a mold, an invertible table, having a plurality of spring loaded roller assemblies mounted therein for the purpose of positioning and supporting a mold parallel to a plane surface thereof, said roller assemblies being yieldable so as to permit the mold to be drawn towards the said plane surface of the table, said table having also mounted therein a plurality of yieldable hollow stem assemblies each having a flexible gasket protruding beyond the said plane surface of the table and being each connected to an individual check valve responsive to velocity of fluid flow therethrough so as to shut off the flow of fluid therethrough when the velocity of flow exceeds a predetermined degree, said table having also mounted therein electromagnetic windings for the purpose of drawing the mold towards the said plane surface of the table and against the said flexible gaskets protruding therebeyond, thereby establishing a plurality of separate connections between the several yieldable hollow stem assemblies and the mold.

5. In a device for ejecting molded articles from a mold, a hollow stem assembly mounted in a base member, said hollow stem assembly comprising a tube slidably disposed in the base member and having an enlarged gasket receiving head, a formed gasket of resilient material removably receiving in said head, spring means to urge the tube in a longitudinal direction thereby to resist pressure which may be applied against said gasket, a body secured to said base member and containing said spring means, a spring retainer threadedly engaging said body for adjusting the tension of said spring means, a stop nut threadedly engaging said tube remote from the gasket receiving head thereof for adjusting the position of the tube relative to the base member, a removable cap for said body, and means to admit a fluid to said body so that said fluid may be conducted by said tube to emerge therefrom at said gasket.

6. In combination: a mold having a plurality of mold cavities therein, a fluid passage connecting into each cavity below the mold product to be formed therein, a member engageable with the mold and having fluid passages to register with those in the mold plate, yieldable, resilient means, compressible between the mold and the member for sealing the passages in the mold to the passages in the member, connections to supply fluid under pressure to all of said passages, and flow control valves in each passage, each said valve having passage closing means operable in response to the free flow of fluid occurring only after the product has been freed from the particular mold cavity.

7. The combination of claim 6, plus valves adjacent each mold cavity to close the passage thereinto, spring means for each valve urging the same toward closed position, and fluid pressure responsive means to cause displacement of the valves when fluid under pressure is supplied to the passages.

8. The combination of claim 7, wherein the valves are movable by said fluid pressure means into their cavities, so as to engage the products in the cavities to urge said products from the cavities.

9. The combination of claim 6, wherein there is magnetic means to hold the mold and the member firmly together to maintain the respective fluid passages in registry.

10. The combination of claim 9, wherein the connections to supply fluid under pressure have a common source; and sequentially operable means to operate the magnetic means and to effect admission of fluid pressure to said common source in predetermined order.

11. In a mechanism of the kind described, an ejector table having support shaft means for rotation of the same, a main fluid passage through the shaft, a plurality of individual passages through the table for registry with corresponding passages in a mold having a cavity for each of the corresponding passages; means including an individual supply passage for each of the several passages in the table for connecting the latter with the main fluid passage; magnetic means in the table for clamping the mold thereto; a flow control valve in each of the individual supply passages, adapted to close its supply passage in response only to the free flow resulting when a molded product is freed from its cavity in the mold; means for controlling fluid pressure in the main passage; means to rotate the table; and means to cause the magnetic means, the rotating means, and the fluid pressure controlling means to operate in a predetermined order.

12. A method for ejecting molded articles from a mold having a plurality of mold cavities therein, comprising advancing the mold to a predetermined station, inverting the mold, applying fluid pressure substantially simultaneously to all of said plurality of cavities, cutting off the fluid pressure from each cavity individually and automatically in response to predetermined decrease in pressure produced by fluid flow through the cavity resulting from relief of the obstruction of the cavity by the molded article occurring upon ejection of a molded article therefrom, reverting the mold, and withdrawing the mold from said station.

13. In a device for ejecting the contents of a mold having a plurality of mold cavities containing molded articles, each mold cavity having associated therewith individual means to receive fluid pressure whereby the molded articles may be expelled from the mold cavities: a table having a plurality of openings therein, said openings being adapted to communicate respectively with the aforesaid means to receive fluid pressure, said table having also individual passages communicating respectively with said openings whereby to conduct fluid to the aforesaid means to receive fluid pressure, mounting means for said table providing for pivotal inversion thereof, and actuatable means mounted in said table for retaining said mold in contact therewith when the table is inverted for the purpose of ejecting the contents of the mold.

14. The combination of claim 13 wherein the actuatable means comprises electromagnetic means.

15. The combination of claim 13 wherein each of the openings is provided with yieldable means for engaging the mold and making individual pressure connections between the openings and the means to receive fluid pressure.

16. The combination of claim 13 plus individual valve means associated respectively with each of the individual passages, each of said individual valve means including movable means responsive to a predetermined velocity of fluid flow through the particular valve means for limiting the velocity of fluid flow through the particular associated passage.

References Cited in the file of this patent

UNITED STATES PATENTS

| Number | Name | Date |
|---|---|---|
| 72,793 | Bundy | Dec. 31, 1867 |
| 808,479 | Riddle | Dec. 26, 1905 |
| 1,301,685 | Graham | Apr. 22, 1919 |
| 1,341,798 | Graham | June 1, 1920 |
| 1,639,430 | Gammeter | Aug. 16, 1927 |
| 1,655,878 | Reif | Jan. 10, 1928 |
| 1,948,344 | Fischer | Feb. 20, 1934 |
| 1,956,192 | Donnelly | Apr. 24, 1934 |
| 2,008,574 | Bock | July 16, 1935 |
| 2,023,002 | Bosomworth | Dec. 3, 1935 |
| 2,025,226 | Creveling | Dec. 24, 1935 |
| 2,025,228 | Clark | Dec. 24, 1935 |
| 2,148,084 | Nock | Feb. 21, 1939 |
| 2,196,080 | Reynoldson | Apr. 2, 1940 |
| 2,292,410 | Strong | Aug. 11, 1942 |
| 2,396,406 | Anderson | Mar. 12, 1946 |
| 2,424,835 | Luckey et al. | July 29, 1947 |
| 2,615,676 | Neubauer | Oct. 28, 1952 |
| 2,629,897 | Mahla | Mar. 3, 1953 |
| 2,632,207 | Mahla | Mar. 24, 1953 |